United States Patent
Breyer et al.

(10) Patent No.: US 6,256,625 B1
(45) Date of Patent: Jul. 3, 2001

(54) VIDEO ACQUISITION SYSTEM INCLUDING OBJECTS WITH DYNAMIC COMMUNICATION CAPABILITIES

(75) Inventors: John R. Breyer; Paul F. Austin, both of Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/153,383

(22) Filed: Sep. 15, 1998

(51) Int. Cl.$^7$ ..................................... G06F 17/30

(52) U.S. Cl. .................. 707/3; 707/2; 345/326; 345/328; 700/83

(58) Field of Search .................. 700/83; 707/1, 707/2, 3; 345/326, 328

(56) References Cited

U.S. PATENT DOCUMENTS

| | | | |
|---|---|---|---|
| 5,742,504 | * | 4/1998 | Meyer et al. ........................ 700/83 |
| 5,818,455 | * | 10/1998 | Stone et al. ........................ 345/433 |
| 5,874,966 | * | 2/1999 | Polimeni et al. ................... 345/431 |
| 6,061,602 | * | 5/2000 | Meyer ................................... 700/83 |

* cited by examiner

Primary Examiner—Jack Choules
Assistant Examiner—Cheryl Lewis
(74) Attorney, Agent, or Firm—Conley, Rose & Tayon PC; Jeffrey C. Hood

(57) ABSTRACT

A video capture system and method which includes improved software control of image acquisition and processing. The method comprises first creating an image application using one or more objects. Acquired data is preferably stored in an image object, and one or more objects, e.g., a viewer object or image processing object, are configured to share the image object, i.e., to dynamically bind to or communicate with the image object during program execution. When the application begins execution, the computer system acquires image data and stores the image data in an image object. A first object then dynamically binds to the image object, i.e., communicates with the image object, to access the image data contained in the image object and process the image data in response to the binding. This dynamic binding or communication, as well as the subsequent processing of the image data, occurs without user intervention. When the image data comprised in the image object changes, the image object automatically notifies one or more first objects which are bound to the image object, and each first object automatically accesses the changed image data and processes the changed image data.

65 Claims, 5 Drawing Sheets

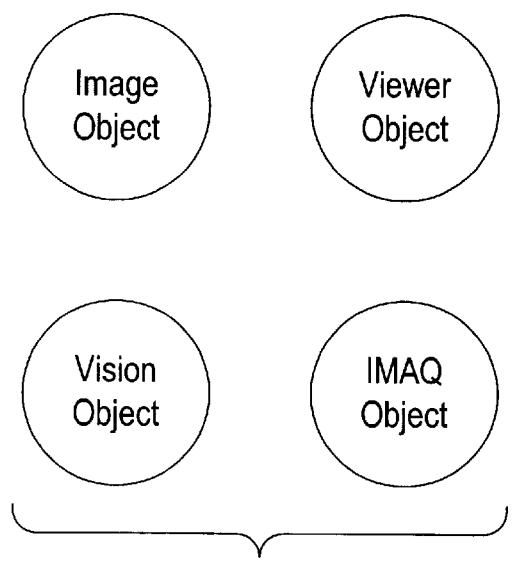
FIG. 3
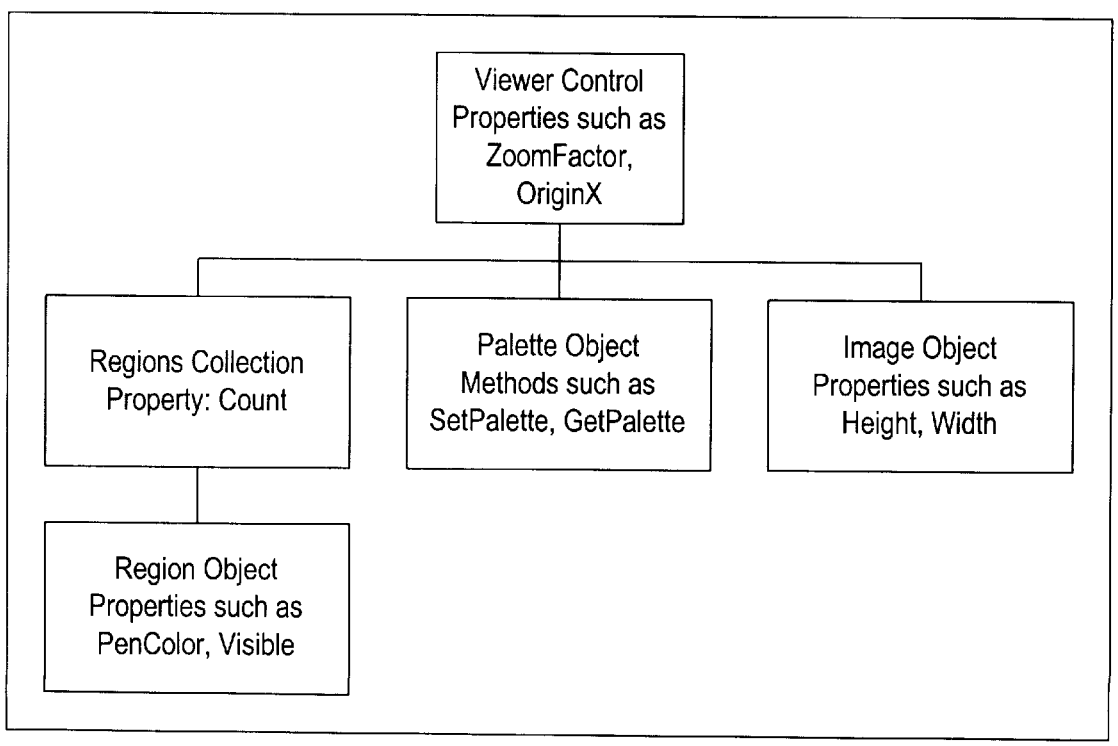
FIG. 4 - Viewer Control Object Hierarchy

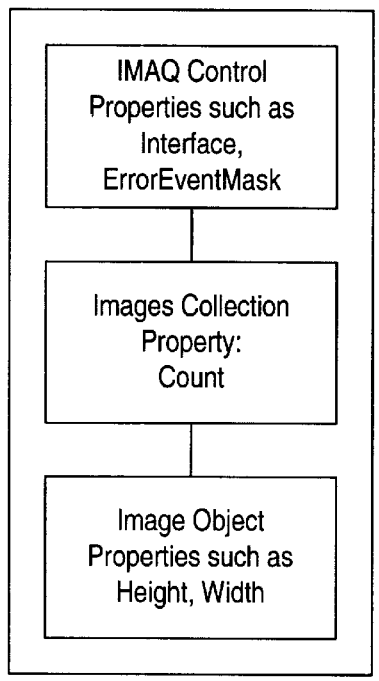
FIG. 5 - IMAQ Control Object Hierarchy
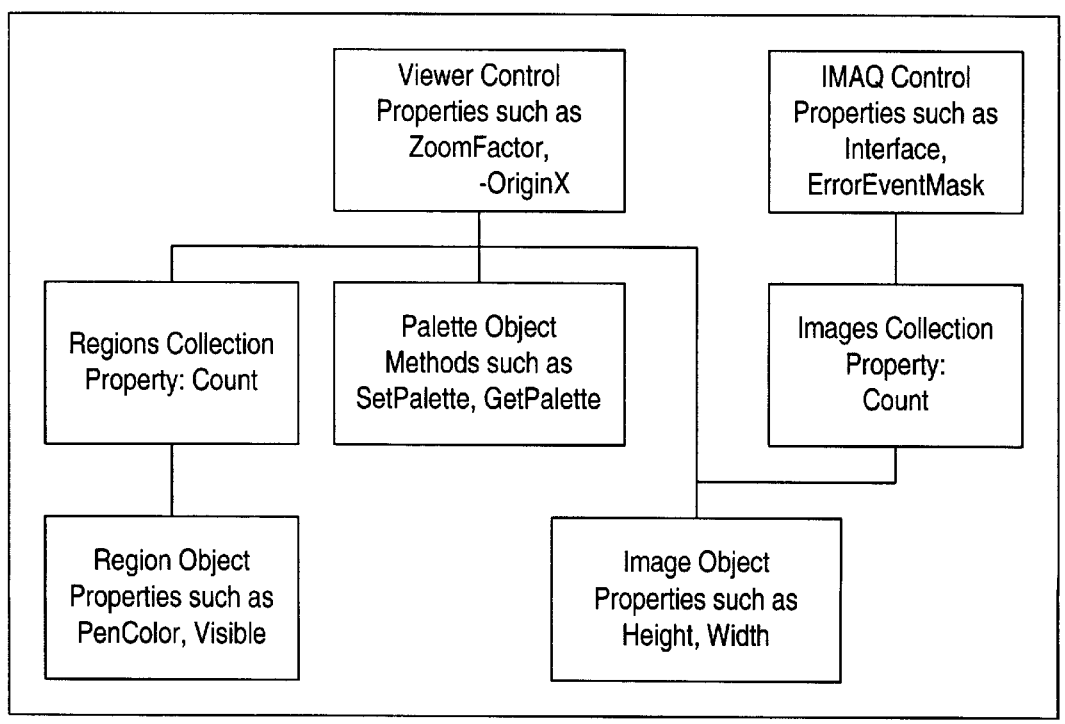
FIG. 6 - Viewer Control and IMAQ Control Can Share an Image Object

VIDEO ACQUISITION SYSTEM INCLUDING OBJECTS WITH DYNAMIC COMMUNICATION CAPABILITIES

FIELD OF THE INVENTION

The present invention relates to the field of image acquisition, and more particularly to software for creating image acquisition applications for acquiring image data, processing the image data, and displaying the image data.

DESCRIPTION OF THE RELATED ART

The problem of acquiring video data into computer system memory (i.e. the main memory of a computer system) is increasingly the subject of attention in the field of image/video processing.

A host computer system generally employs a video acquisition device, such as a video acquisition board, to perform video frame acquisition. Video acquisition boards generally provide for fast and efficient acquisition of video frames from video source devices. Typical video sources include industrial cameras, camcorders, video cameras, VCRs, TV tuners, and laserdisk players. Software executing on the computer system controls the video acquisition device and is operable to perform various types of image processing on acquired image data. As the performance of video acquisition devices increases, coupled with improvements in CPU capacity, improvements in software image processing are also desired.

In order to create an image acquisition system, the user is typically required to create code which acquires or captures the image data and either processes the image data and/or displays the image data. As the image data is processed or displayed, it is desirable to avoid making copies of the image data. Image data is typically large in size, and copying carries significant overhead. One frequent situation where image data is copied is for display. The acquired image data is often moved into a buffer which is used as the source data for drawing the image. This can cause image refresh to slow down, particularly with large images. The user also has the responsibility to keep the display up to date. When the image data is modified, the user must redraw the image on the screen by repeatedly calling a redraw function. This requires more work by the user and is dependent on the programming environment, and further adds more programming overhead to the display mechanism.

U.S. Pat. No. 5,742,504 titled "Method and System for Quickly Developing Application Software For Use in a Machine Vision System" (the '504 patent) discloses a system for developing application software in a machine vision system using sets of custom controls. This patent describes a system which includes a first custom control program which stores hardware operating parameters for image capture. The system also includes a user interface custom control program for display of an image. The user interface custom control program consists of a Windows handle that represents a screen area. The first custom control program operates to capture and store image data and maintains a copy of the Windows handle for drawing the image on the screen. In order to draw the image on the screen, the first custom control program uses its copy of the Windows handle to write the image data to the respective portion of the frame buffer corresponding to the screen area represented by the handle. The first custom control program can only store a copy of one Windows handle, and thus only one user interface custom control program can be linked to a first custom control program. Also, the user interface custom control program does not perform any processing on the image data, but rather simply provides a Windows handle which is used by the first custom control program. In addition, the first custom control program can only bind to one user interface custom control program.

In the '504 patent, one or more user interface custom control programs can be statically linked to a first custom control program, wherein each user interface custom control program displays an image from the first custom control program. However, the system in the '504 patent only allows each respective user interface custom control program to display the image at a specific point in time, and the user interface custom control programs will not automatically update as the image data changes. Thus this provides only a static link, not a dynamic binding.

Therefore, an improved system and method is desired for acquiring and processing image data. More particularly, an improved system and method is desired which enables the acquisition and processing of video data with minimal user intervention requirements.

SUMMARY OF THE INVENTION

The present invention comprises a video capture system and method which includes improved software control of image acquisition and processing. The video capture system comprises a host computer coupled to a video source, such as a video camera. The host computer includes a CPU, a system memory, and a video capture device which receives the video data or image data from the video source. The computer system memory stores a plurality of objects which are operable to control acquisition and processing of image data with reduced user intervention.

The method comprises first creating an image application using one or more objects, e.g., an IMAQ hardware object for acquiring image data, a viewer object for displaying the image corresponding to the image data, and/or a vision object for performing image processing on the image data. Acquired data is preferably stored in an image object. In the preferred embodiment, the user invokes an attach method on one or more objects, such as viewer or vision objects, to enable the respective object(s) to share an image object. Thus, these objects are operable to dynamically bind to, i.e., communicate with, the image object during program execution.

After the user creates the application, the user then initiates execution of the application. After the application begins execution, the computer system operates to acquire image data corresponding to an image and store the image data in an image object. The one or more configured objects, referred to generically as the first object, then dynamically binds to the image object, i.e., communicates with the image object, to access the image data contained in the image object. The first object processes the image data in response to binding to the image object. For example, if the first object is a viewer object, the viewer object displays an image on the display screen corresponding to the image data. If the first object is a vision object, the vision object performs an image processing function on the image data.

This dynamic binding or communication, as well as the subsequent processing of the image data, occurs without user intervention. In other words, the user is not required to perform any action during execution to enable or trigger the first object dynamically binding or communicating with the image object. In the preferred embodiment the user is only required to invoke an attach method on the first object during creation of the program to enable the dynamic binding.

When the image data comprised in the image object changes, such as a result of a new acquisition or an image processing operation, the image object automatically notifies the one or more first objects which are bound to the image object. In the preferred embodiment, the memory of the computer system stores a container program which contains the image object and the first object, and the image object preferably notifies the first object independent of the container program. In response to the notification, the first object automatically accesses the changed image data and processes the changed image data. For example, if the first object is a viewer object, the viewer object displays an image on the display screen corresponding to the changed image data. If the first object is a vision object, the vision object performs an image processing function on the changed image data.

The image object automatically notifies the one or more first objects, and each of the first objects automatically accesses the changed image data and processes the changed image data, without user intervention, i.e., without any user action required during execution. In the preferred embodiment the user invoking the attach method on the first object during creation of the program enables operation of the image object notifying the one or more first objects which are bound to the image object. This notification in turn causes each of the first objects to automatically access the changed image data and process the changed image data.

BRIEF DESCRIPTION OF THE DRAWINGS

A better understanding of the present invention can be obtained when the following detailed description of the preferred embodiment is considered in conjunction with the following drawings, in which:

FIG. 3 illustrates various software objects used for creating an image acquisition application;

FIG. 4 illustrates the viewer control object hierarchy;

FIG. 5 illustrates the IMAQ hardware control object hierarchy;

FIG. 6 illustrates the object hierarchies where the viewer control and the IMAQ hardware control share an image object.

Figure 1:
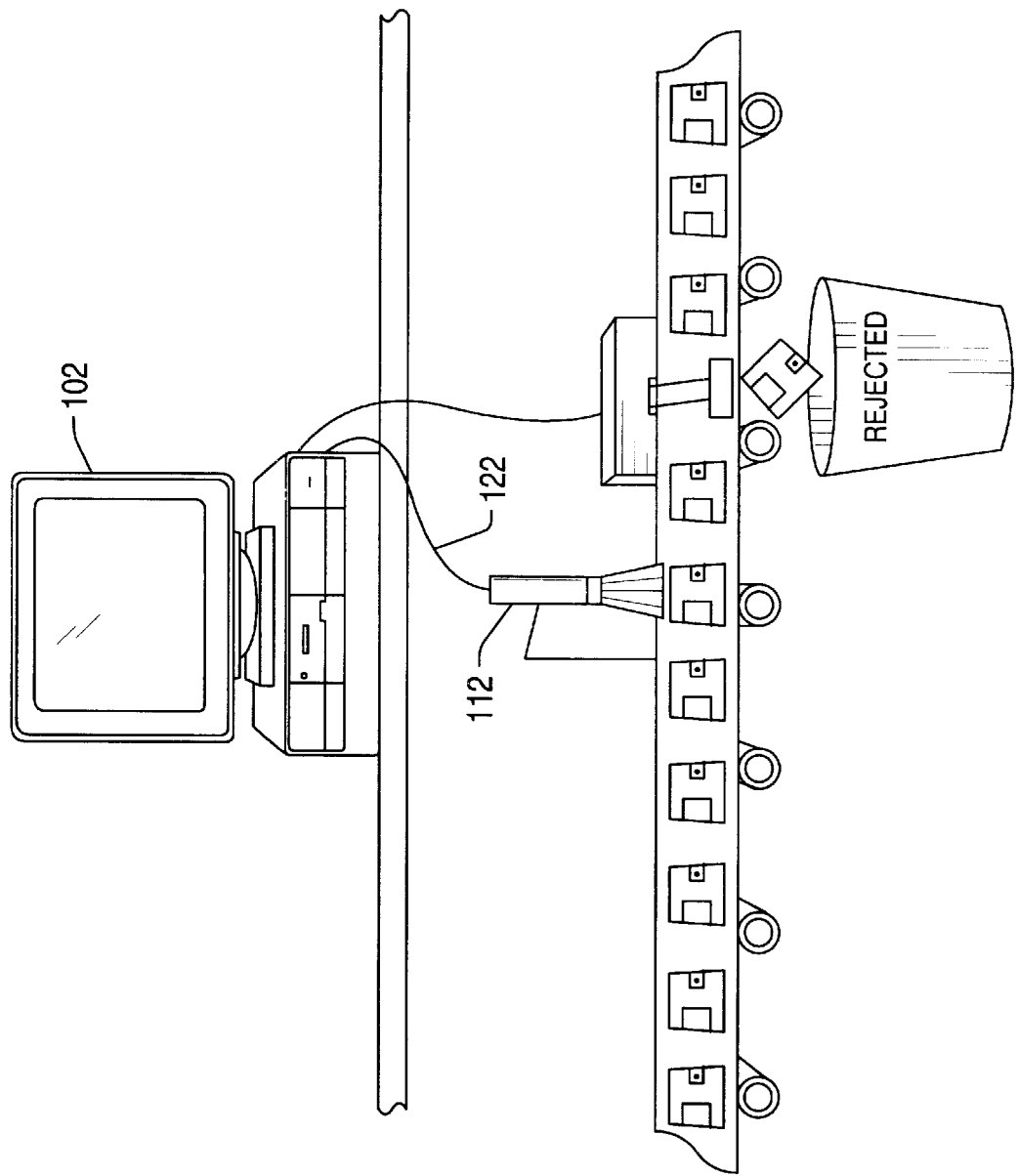
FIG. 1 illustrates a video capture system according to one embodiment of the present invention.

While the invention is susceptible to various modifications an alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1—Video Capture System

FIG. 1 illustrates a video capture system according to the preferred embodiment of the present invention. The video capture system comprises a host computer 102 and a video source 112. The video source 112 preferably produces an analog or digital video signal which comprises an image, or a sequence of video frames, or other data desired to be acquired. The video signal is provided through a wire or cabling 122 to the host computer 102 for storage and/or processing.

Figure 2:
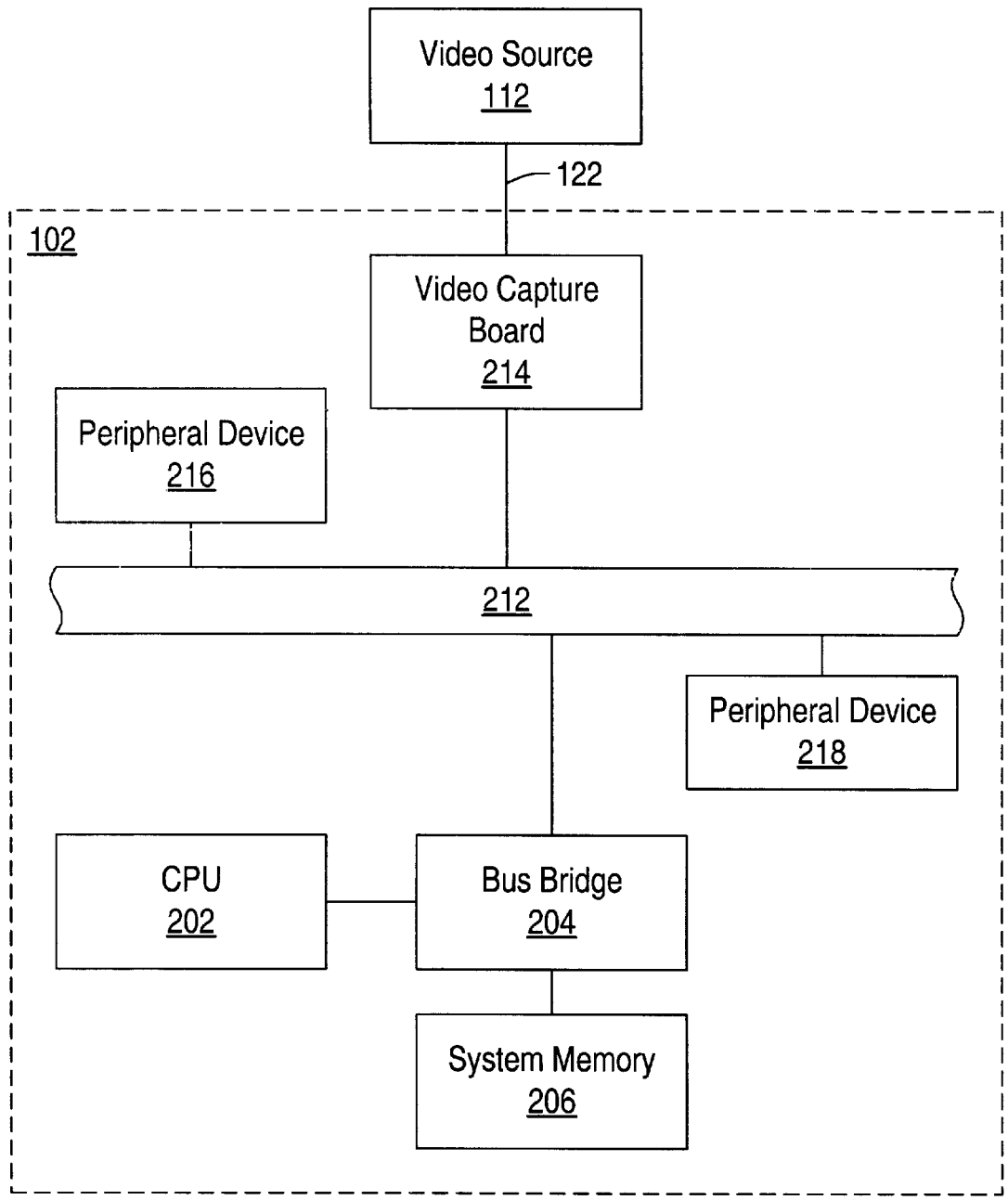
FIG. 2 is a high-level block diagram of the video capture system.

FIG. 2—Video Capture System Block Diagram

Referring now to FIG. 2, a high-level block diagram of the video capture system according to the present invention is presented. It is noted that the block diagram of FIG. 2 is exemplary only, and other computer system architectures may be used as desired.

The host computer 102 comprises a CPU 202, a bus bridge 204, system memory 206, and a peripheral bus 212. The CPU 202 is coupled to the bus bridge 204. The bus bridge 204 is coupled to the system memory 206 and the CPU 202, and couples to the peripheral bus 212. In the preferred embodiment, the peripheral bus 212 is the PCI expansion bus. However, it is noted that other types of buses may be used.

The host computer system 102 also includes a video capture device or board 214 which is adapted for coupling to the video source 112. The video capture device 214 is preferably coupled to the peripheral bus 212. In addition to the video capture device 214, other peripheral devices (216 and 218) may be coupled to the peripheral bus 212, such as audio cards, modems, graphics cards, network cards, etc.

The video source 112 supplies the video signals to the video capture device 214. The video capture board 214 preferably performs AID (analog to digital) conversion if the received signals are analog signals. The video capture device 214 temporarily stores the digitized image data, e.g., video frames, in an on-board buffer until it can arrange for transfer to the system memory 206 through peripheral bus 212 and bus bridge 204. In the present application, the term "image data" is intended to refer to data representing an image or sequence of images, including compressed data.

FIG. 3—Objects

FIG. 3 illustrates various software objects which may be used in an image acquisition application according to the preferred embodiment of the present invention. As shown, these objects include an image object, a viewer object, a vision object and an IMAQ hardware object. The viewer object is preferably instantiated from a viewer control, the IMAQ hardware object is preferably instantiated from an IMAQ hardware control and the vision object is preferably instantiated from a vision control. The viewer control, vision control, and IMAQ hardware control preferably comprise Active X controls. However, the above objects may comprise any of various types of software objects, components or reusable software elements.

The IMAQ hardware object, also referred to as the hardware object, is operable to acquire images. In other words, the IMAQ hardware object operates to control the image acquisition hardware to acquire an image. The viewer object is operable to display an image which has been acquired into the image object. The vision object is operable to perform various types of image processing functions on the image data comprised in the image object.

The image object is an object which encapsulates image data. The image object contains properties for manipulating image attributes and provides a mechanism according to the present invention for communicating between the IMAQ hardware object and the viewer object.

The user operates to create an image acquisition application by placing one or more of the hardware object, viewer object and vision object into the application and optionally configuring properties and/or methods of these objects for the desired application. The user may create a plurality of hardware objects, viewer objects and vision objects, as desired.

FIG. 4—Viewer Control Object Hierarchy

As mentioned above, the viewer control is used to display and manipulate images. The viewer control displays static or live (dynamic) images and supports graphical region of interest tools. The viewer object is constructed from a hierarchy of objects as shown in FIG. 4. The objects in the viewer control represent the different parts displayed on the physical representation of the viewer, including the viewer object, regions collection and region object, palette object, and image object. The regions collection and regions object are objects used to control the selection of regions of interest on the image. Regions are used to construct a mask image that various image processing functions can use. The palette object is an object that controls the mapping of bit map pixel values to colors viewed on the screen. Palettes are used to view image data in different ways. As mentioned above, the image object holds data defining the image to be displayed.

The viewer object is an instantiation of the viewer control and contains the basic properties of the control such as border width and zoom scale. The viewer object includes some properties, such as name and color, that the user can set in the property pages during application design. The viewer object also includes other properties referred to as OriginX, OriginY and ZoomScale that affect how the viewer object displays an image. The viewer object also includes several methods which are called directly on the viewer control such as attach, detach and center. The attach method replaces the image object with an image that the user passes as a parameter to the attach method, causing the viewer object to display the new image and automatically update it as the image changes. The detach method operates to break the connection between a viewer object and an image object, wherein the image is no longer displayed. The center method operates to center the viewer object around a point specified by a parameter to the center method.

FIG. 5—IMAQ Hardware Control

FIG. 5 illustrates the object hierarchy for the IMAQ hardware control. As shown, the IMAQ hardware control operates to acquire images from image acquisition hardware, including the capture of single or multiple images in continuous or single shot mode. The IMAQ hardware control can preferably be configured from many different modes including start triggers, skip counts and frame or field mode. After the properties are set, the application can perform acquisitions using method calls. As shown in FIG. 5, the object hierarchy of the IMAQ hardware control utilizes the image collection object and the image object. The images collection and image objects represent the acquired images. When multiple images are required, additional image objects are added to the images collection. As discussed above, the image object encapsulates image data and contains properties for manipulating image attributes. The image object further provides a mechanism for communicating between the IMAQ hardware object and the viewer object.

The IMAQ hardware control contains an image collection which can store multiple image objects. An image object contains the data that the hardware control has acquired. The image object comprised in the viewer object contains the data that the viewer object displays. As discussed further below, an image object can be shared between an IMAQ hardware object and a viewer object. As discussed further below, when a new image is acquired by the IMAQ hardware object into an image object, the viewer object is automatically notified and automatically operates to display the acquired image. This occurs without user intervention, i.e., without the user having to write any code.

As mentioned above, an IMAQ hardware object is instantiated from the IMAQ hardware control. The IMAQ hardware object includes an interface property that selects the hardware device used by the control. The user sets this property on a property page for each control, or this property can be set programmatically. The IMAQ hardware object includes additional properties referred to as stop condition and start condition, which allow the user to configure how the acquisition will operate. For example, the acquisition may run continuously or start on a trigger as configured by the user.

FIG. 6—Binding to an Image Object

FIG. 6 illustrates the manner in which the viewer control and the IMAQ control operate to share an image object. In order to enable a viewer object to use or bind to an image object, the user uses the attach method on the viewer object. For example, the following code operates to invoke the attach method on the viewer object:

CWIMAQViewer1.Attach CWIMAQ1.Images(1)

In the preferred embodiment, the user can also configure a vision object to use or bind to an image object by using a similar attach method on the vision object. As shown in FIG. 6, one or more viewer objects and one or more vision objects can each bind to the same image object, whereby the respective objects share the image object.

Figure 7:
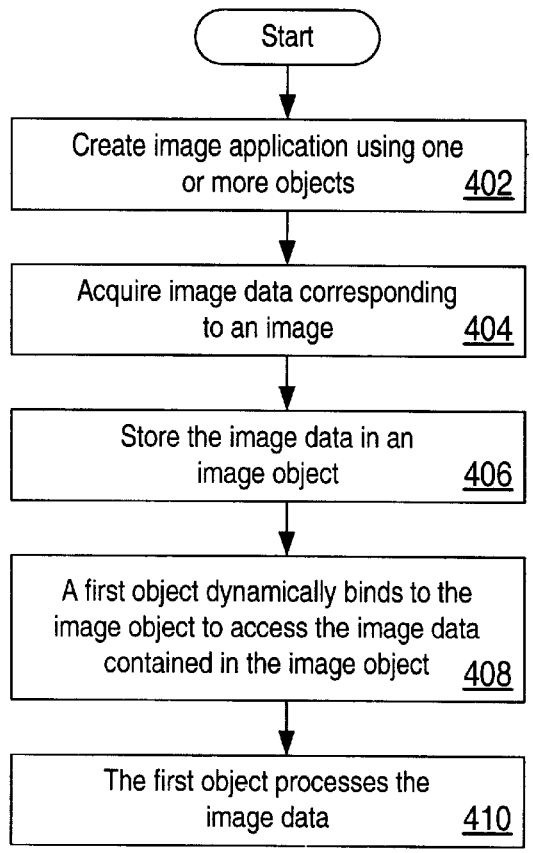
FIGS. 7 and 8 are flowchart diagrams illustrating operation of the software objects according to the present invention.
Figure 8:
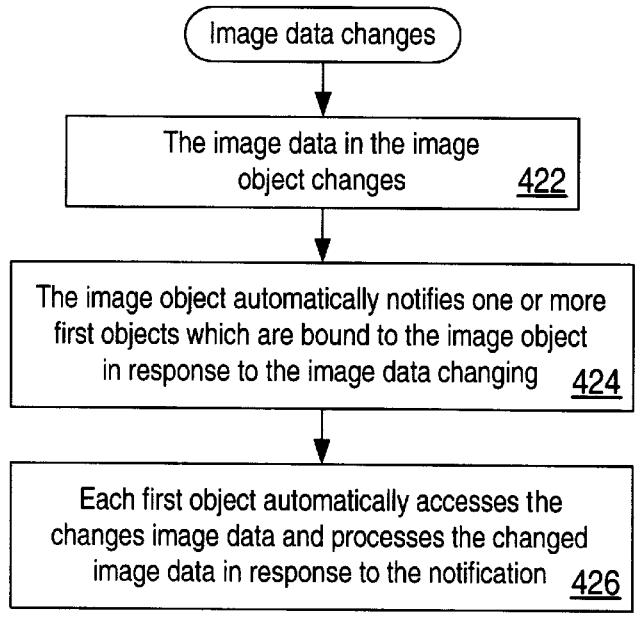

FIGS. 7 and 8—Flowchart Diagrams

FIGS. 7 and 8 are flowchart diagrams illustrating operation of the present invention. The present invention comprises a method for acquiring, processing and displaying images. As shown in FIG. 7, the method comprises first creating an image application using one or more objects. For example, the creation of the image application may involve an IMAQ hardware object for acquiring image data, a viewer object for displaying the image corresponding to the image data, and/or a vision object for performing image processing on the image data. The user may create a plurality of viewer objects and/or a plurality of vision objects, as desired. In the preferred embodiment, the user invokes the attach method on an object, such as one or more of a viewer object or a vision object, to enable the respective object(s) to dynamically bind to an image object. Thus, one or more of the viewer object or the vision object are operable to dynamically bind to, i.e., communicate with, the image object during program execution. The user may invoke the attach method on a plurality of viewer objects and/or a plurality of vision objects, as desired.

The application is preferably created using software objects or components, such as ActiveX controls, or other reusable software elements. The components or objects are preferably placed in a container program. In the preferred embodiment, the user creates the application using the Component Works software available from National Instruments.

After the user creates the application, the user then initiates execution of the application. After the application begins execution, the computer system operates to acquire image data corresponding to an image in step 404 and store the image data in an image object in step 406. Thus the video source 112 provides image data (analog or digital) to the image acquisition hardware 214. The image acquisition hardware or video capture board 214 operates to acquire the image data, optionally perform A/D (analog to digital) conversion if the received data is analog data, and store the image data into computer system memory 206, or optionally on-board memory.

A first object then dynamically binds to the image object to access the image data contained in the image object in step 408. Examples of the first object include one or more viewer objects and/or one or more vision objects, among others. Thus it is noted that a plurality of first objects, i.e., a plurality of viewer objects and/or a plurality of vision objects, may dynamically bind to the image object. The first object dynamically binding to the image object comprises the first object communicating with the image object during execution to access the image data contained in the image object. In step 410 the first object processes the image data in response to binding to the image object. For example, if the first object is a viewer object, the viewer object displays an image on the display screen corresponding to the image data. If the first object is a vision object, the vision object performs an image processing function on the image data.

This dynamic binding or communication, as well as the subsequent processing of the image data, occurs without user intervention. In other words, the user is not required to perform any action during execution to enable or trigger the first object dynamically binding or communicating with the image object. In the preferred embodiment the user is only required to invoke an attach method on the first object during creation of the program to enable the dynamic binding. Once the attach method has been invoked, then the dynamic binding occurs during execution without user intervention.

FIG. 8 is a flowchart diagram which illustrates operation when the image data changes. As shown, in step 422 the image data comprised in the image object changes. The image data may change as a result of a new image acquisition, or an image processing operation on the current image data, among others. In step 424 the image object automatically notifies one or more first objects which are bound to the image object in response to the image data comprised in the image object changing. As discussed above, the memory of the computer system stores a container program which contains the image object and the first object, wherein the image object and the first object are instantiated from the container. In the preferred embodiment, the image object notifies the first object independent of the container program.

In response to the notification in step 424, in step 426 the first object automatically accesses the changed image data and processes the changed image data. For example, if the first object is a viewer object, the viewer object displays an image on the display screen corresponding to the changed image data. If the first object is a vision object, the vision object performs an image processing function on the changed image data.

The image object automatically notifies the one or more first objects, and each of the first objects automatically accesses the changed image data and processes the changed image data, without user intervention, i.e., without any user action required during execution. In the preferred embodiment the user invoking the attach method on the first object during creation of the program enables operation of the image object notifying the one or more first objects which are bound to the image object. This notification in turn causes each of the first objects to automatically access the changed image data and process the changed image data.

Object Interfaces and Dynamic Binding

For the viewer object, dynamic binding is accomplished through the Attach mechanism on the CWIMAQViewer control. The Attach method takes a single parameter, which is an IDispatch interface to a CWIMAQImage object. An IDispatch interface is a standard mechanism through which a container program communicates to ActiveX controls.

Some examples of setting up dynamic binding are as follows:
CWIMAQViewer1.Attach CWIMAQ1.Images(1)
Or
Dim i as New CWIMAQImage
CWIMAQViewer1.Attach i In addition to the standard IDispatch interfaces, the CWIMAQViewer and CWIMAQImage objects each have private custom interfaces. Custom interfaces are defined and implemented by the software developer, and are unique to individual controls. These interfaces allow the objects access special operations on each other, without exposing these operations to the user.

For dynamic binding, the special operations that exist in the private interfaces are as follows:
CWIMAQViewer
   Update
CWIMAQImage
   GetDataPtr
   AttachViewer
   DetachViewer
   Update When the Viewer's Attach method is invoked, the Viewer is passed an IDispatch interface for an Image object. The IDispatch interface allows the Viewer control to obtain the private interface for the Image object. Once the Image object's private interface is obtained, the Viewer object invokes the AttachViewer method on the private interface. The Viewer's interface is passed to the Image object as a parameter to the AttachViewer function.

At this point the dynamic binding relationship has been established. The Image object has a reference to the Viewer's private interface, and the Viewer has a reference to the Image's private interface. This process can be repeated for a single image on multiple images, the result being that a single image object can have references to multiple Viewer objects.

When the data inside of an Image object is modified, it is the responsibility of the object that modified the data to call Update on the Image object's private interface. This causes the Image object to call Update on all Viewer interfaces that it has references to.

When Update is called on a Viewer Control's private interface, it invokes the GetDataPtr method on the Image object's private interface. This method gives the viewer access to the actual image data, from which it can redraw the image in it's window.

Viewer's can detach themselves from Image objects by invoking the DetachViewer method on the Image object's private interface. The Viewer object will release it's reference to the Image's private interface, and the Image object will remove its reference to the Viewer that invokes the Detach method. If no other references remain to the Image object, the entire object will be deleted from memory.

Although the system and method of the present invention has been described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

We claim:

1. An image acquisition system, comprising:

an image acquisition device for acquiring an image;

a computer system coupled to the image acquisition device, wherein the computer system includes a video display and a memory, wherein the memory of the computer system stores:

an image object which stores image data corresponding to the acquired image;

a first object which is operable to process the image data, wherein the first object is configurable by the user to bind to the image object;

wherein, in response to user configuration, the first object is operable to dynamically bind to the image object to access the image data contained in the image object, wherein the first object is operable to process the image data in response to binding to the image object, wherein the first object is operable to dynamically bind to the image object and process the image data without user intervention.

2. The system of claim 1, wherein when the image data comprised in the image object changes, the image object is operable to automatically notify one or more first objects which are bound to the image object, wherein said automatic notification occurs without user intervention or user code.

3. The system of claim 2, wherein the first object is operable to automatically access the changed image data and process the changed image data in response to notification from the image object, wherein the first object is operable to automatically access the changed image data and process the changed image data without user intervention.

4. The system of claim 2, wherein the memory of the computer system stores a container program which contains the image object and the first object, wherein the image object and the first object are instantiated from the container;

wherein the image object is operable to notify the first object independent of the container program.

5. The system of claim 1, wherein when the image data comprised in the image object changes, the first object is operable to automatically access the changed image data and process the changed image data, wherein the first object is operable to automatically access the changed image data and process the changed image data without user intervention.

6. The system of claim 1, wherein the first object is a viewer object which is operable to display the image on the display screen.

7. The system of claim 6, wherein when the image data comprised in the image object changes, the image object is operable to automatically notify one or more viewer objects which are bound to the image object, wherein the one or more viewer objects are each operable to automatically access the changed image data and display an image corresponding to the changed image data in response to said automatic notification;

wherein the image object is operable to notify the one or more viewer objects, and the one or more viewer objects are each operable to access the changed image data and display an image corresponding to the changed image data without user intervention.

8. The system of claim 1, wherein the first object is operable to perform an image processing algorithm on the image data corresponding to the image.

9. The system of claim 1, wherein the memory of the computer system stores a program which contains the image object and the viewer object, wherein in the program the first object is configured to dynamically bind to the image object;

wherein the program includes program instructions which are executable to invoke a method on the first object which cause the first object to dynamically bind to the image object.

10. The system of claim 1, further comprising:

a plurality of first objects which are each operable to process the image data, wherein each of the first objects is configurable by the user to bind to the image object;

wherein, in response to user configuration, each of the first objects is operable to dynamically bind to the image object to access the image data contained in the image object, wherein each of the first objects is operable to process the image data in response to binding to the image object, wherein each of the first objects is operable to dynamically bind to the image object and process the image data without user intervention.

11. The system of claim 10, wherein when the image data comprised in the image object changes, the image object is operable to automatically notify the plurality of first objects which are bound to the image object, wherein said automatic notification occurs without user intervention or user code.

12. The system of claim 11, wherein each of the first objects is operable to automatically access the changed image data and process the changed image data in response to notification from the image object, wherein each of the first objects is operable to automatically access the changed image data and process the changed image data without user intervention.

13. The system of claim 1, wherein the first object includes a method which is invoked by the user to bind the first object to the image object.

14. The system of claim 1, wherein the first object includes a method which is invoked by the user to unbind the first object from the image object.

15. A method for acquiring images, the method comprising:

acquiring image data corresponding to an image;

storing the image data in an image object in response to said acquiring;

a first object dynamically binding to the image object to access the image data contained in the image object;

the first object processing the image data in response to binding to the image object;

wherein the first object is operable to dynamically bind to the image object and process the image data without user intervention.

16. The method of claim 15, further comprising:

the image data comprised in the image object changing;

the image object automatically notifying one or more first objects which are bound to the image object in response to the image data comprised in the image object changing, wherein said automatically notifying occurs without user intervention.

17. The method of claim 16, further comprising:

the first object automatically accessing the changed image data and processing the changed image data in response to the image object automatically notifying, wherein the first object automatically accesses the changed image data and processes the changed image data without user intervention.

18. The method of claim 16, wherein the memory of the computer system stores a container program which contains the image object and the first object, wherein the image object and the first object are instantiated from the container;

wherein the image object notifies the first object independent of the container program.

19. The method of claim 15, further comprising:

the image data comprised in the image object changing;

the first object automatically accessing the changed image data and processing the changed image data in response to the image data comprised in the image object changing, wherein the first object automatically accessing the changed image data and processing the changed image data occurs without user intervention.

20. The method of claim 15, wherein the first object is a viewer object which is operable to display the image on the display screen;
wherein the first object processing the image data comprises the first object displaying an image on the display screen corresponding to the image data.

21. The method of claim 20, further comprising:
the image data comprised in the image object changing;
the image object automatically notifying one or more viewer objects which are bound to the image object;
the one or more viewer objects automatically accessing the changed image data and displaying an image corresponding to the changed image data in response to the image object automatically notifying the one or more viewer objects which are bound to the image object;
wherein the image object notifies the one or more viewer objects, and the one or more viewer objects are each operable to access the changed image data and display an image corresponding to the changed image data without user intervention.

22. The method of claim 15, wherein the first object is operable to perform an image processing algorithm on the image data corresponding to the image;
wherein the first object processing the image data comprises the first object performing an image processing algorithm on the image data.

23. The method of claim 15, further comprising:
creating an image application, wherein said creating includes configuring the first object to dynamically bind to the image object;
initiating execution of the image application, wherein said acquiring image data, said storing the image data, said dynamically binding, and said processing are performed in response to said initiating execution of the image application.

24. The method of claim 23, wherein said configuring the first object to dynamically bind to the image object includes adding program instructions which are executable to invoke a method on the first object which cause the first object to dynamically bind to the image object.

25. The method of claim 15, further comprising:
configuring the first object to dynamically bind to the image object prior to said acquiring the image data.

26. The method of claim 15,
a plurality of first objects each dynamically binding to the image object to access the image data contained in the image object;
each of the plurality of first objects processing the image data in response to binding to the image object;
wherein each of the plurality of first objects is operable to dynamically bind to the image object and process the image data without user intervention.

27. The method of claim 26, further comprising:
the image data comprised in the image object changing;
the image object automatically notifying each of the plurality of first objects which are bound to the image object in response to the image data comprised in the image object changing, wherein said automatically notifying occurs without user intervention or user code.

28. The method of claim 27, further comprising:
each of the plurality of first objects automatically accessing the changed image data and processing the changed image data in response to the image object automatically notifying, wherein each of the plurality of first objects automatically accesses the changed image data and processes the changed image data without user intervention.

29. The method of claim 26, further comprising:
configuring each of the plurality of first objects to dynamically bind to the image object prior to said acquiring the image data.

30. The method of claim 15, wherein the first object includes a method which is invoked by the user to bind the first object to the image object.

31. The system of claim 15, wherein the first object includes a method which is invoked by the user to unbind the first object from the image object.

32. A system for acquiring and displaying images, the system comprising:
an image acquisition device for acquiring an image;
a computer system coupled to the image acquisition device, wherein the computer system includes video display and a memory, wherein the memory of the computer system stores:
an image object which stores image data corresponding to the acquired image;
a viewer object which is operable to display an image, wherein the viewer object is operable to dynamically bind to the image object to access the image data contained in the image object, wherein the viewer object which is operable to display the image corresponding to the image data in response to binding to the image object.

33. The system of claim 32, wherein when the image data comprised in the image object changes, the image object is operable to notify one or more viewer objects which are bound to the image object, wherein the viewer object is operable to access the changed image data and display a new image corresponding to the changed image data.

34. A memory media for use in an image acquisition system, the image acquisition system comprising an image acquisition device for acquiring an image and a computer system coupled to the image acquisition device, wherein the computer system includes a video display, wherein the memory media stores:
an image object which stores image data corresponding to the acquired image; and
a first object which is operable to process the image data, wherein the first object is configurable by the user to bind to the image object;
wherein, in response to user configuration, the first object is operable to dynamically bind to the image object to access the image data contained in the image object, wherein the first object is operable to process the image data in response to binding to the image object, wherein the first object is operable to dynamically bind to the image object and process the image data without user intervention.

35. The memory media of claim 34, wherein when the image data comprised in the image object changes, the image object is operable to automatically notify one or more first objects which are bound to the image object, wherein said automatic notification occurs without user intervention or user code.

36. The memory media of claim 35, wherein the first object is operable to automatically access the changed image data and process the changed image data in response to notification from the image object, wherein the first object is operable to automatically access the changed image data and process the changed image data without user intervention.

37. The memory media of claim 35, wherein the memory of the computer system stores a container program which contains the image object and the first object, wherein the image object and the first object are instantiated from the container;

wherein the image object is operable to notify the first object independent of the container program.

38. The memory media of claim 34, wherein when the image data comprised in the image object changes, the first object is operable to automatically access the changed image data and process the changed image data, wherein the first object is operable to automatically access the changed image data and process the changed image data without user intervention.

39. The memory media of claim 34, wherein the first object is a viewer object which is operable to display the image on the display screen.

40. The memory media of claim 39, wherein when the image data comprised in the image object changes, the image object is operable to automatically notify one or more viewer objects which are bound to the image object, wherein the one or more viewer objects are each operable to automatically access the changed image data and display an image corresponding to the changed image data in response to said automatic notification;

wherein the image object is operable to notify the one or more viewer objects, and the one or more viewer objects are each operable to access the changed image data and display an image corresponding to the changed image data without user intervention.

41. The memory media of claim 34, wherein the first object is operable to perform an image processing algorithm on the image data corresponding to the image.

42. The memory media of claim 34, wherein the memory media stores a program which contains the image object and the viewer object, wherein in the program the first object is configured to dynamically bind to the image object;

wherein the program includes program instructions which are executable to invoke a method on the first object which cause the first object to dynamically bind to the image object.

43. The memory media of claim 34, further comprising:

a plurality of first objects which are each operable to process the image data, wherein each of the first objects is configurable by the user to bind to the image object;

wherein, in response to user configuration, each of the first objects is operable to dynamically bind to the image object to access the image data contained in the image object, wherein each of the first objects is operable to process the image data in response to binding to the image object, wherein each of the first objects is operable to dynamically bind to the image object and process the image data without user intervention.

44. The memory media of claim 43, wherein when the image data comprised in the image object changes, the image object is operable to automatically notify the plurality of first objects which are bound to the image object, wherein said automatic notification occurs without user intervention or user code.

45. The memory media of claim 44, wherein each of the first objects is operable to automatically access the changed image data and process the changed image data in response to notification from the image object, wherein each of the first objects is operable to automatically access the changed image data and process the changed image data without user intervention.

46. An image acquisition system, comprising:

an image acquisition device for acquiring an image;

a computer system coupled to the image acquisition device, wherein the computer system includes a video display and a memory, wherein the memory of the computer system stores:

an image object which stores image data corresponding to the acquired image; and a plurality of first objects which are operable to process the image data, wherein the plurality of first objects are configurable by the user to bind to the image object;

wherein, in response to user configuration, the plurality of first objects are operable to dynamically bind to the image object to access the image data contained in the image object, wherein the plurality of first objects are operable to process the image data in response to binding to the image object, wherein the plurality of first objects are operable to dynamically bind to the image object and process the image data without user intervention;

wherein when the image data comprised in the image object changes, the image object is operable to automatically notify the plurality of first objects which are bound to the image object, wherein said automatic notification occurs without user intervention or user code; and wherein the plurality of first objects are operable to automatically access the changed image data and process the changed image data in response to notification from the image object, wherein the plurality of first objects are operable to automatically access the changed image data and process the changed image data without user intervention.

47. The system of claim 46, wherein the memory of the computer system stores a container program which contains the image object and the plurality of first objects, wherein the image object and the plurality of first objects are instantiated from the container;

wherein the image object is operable to notify the plurality of first objects independent of the container program.

48. The system of claim 46, wherein one or more of the plurality of first objects are viewer objects which are operable to display the image on the video display.

49. The system of claim 48, wherein when the image data comprised in the image object changes, the image object is operable to automatically notify the one or more viewer objects which are bound to the image object, wherein the one or more viewer objects are each operable to automatically access the changed image data and display an image corresponding to the changed image data in response to said automatic notification;

wherein the image object is operable to notify the one or more viewer objects, and the one or more viewer objects are each operable to access the changed image data and display an image corresponding to the changed image data without user intervention.

50. The system of claim 46, wherein each of the plurality of first objects is operable to perform an image processing algorithm on the image data corresponding to the image.

51. The system of claim 46, wherein the memory of the computer system stores a program which contains the image object and the plurality of first objects, wherein in the program each of the plurality of first objects is configured to dynamically bind to the image object;

wherein the program includes program instructions which are executable to invoke a method on each of the plurality of first objects which cause each of the plurality of first objects to dynamically bind to the image object.

52. The system of claim 46, wherein each of the plurality of first objects includes a method which is invoked by the user to bind the first object to the image object.

53. The system of claim 46, wherein each of the plurality of first objects includes a method which is invoked by the user to unbind the first object from the image object.

54. A method for acquiring images, the method comprising:

acquiring image data corresponding to an image;

storing the image data in an image object in response to said acquiring;

a plurality of first objects dynamically binding to the image object to access the image data contained in the image object;

each of the plurality of first objects processing the image data in response to binding to the image object;

wherein each of the plurality of first objects is operable to dynamically bind to the image object and process the image data without user intervention;

the image data comprised in the image object changing;

the image object automatically notifying the plurality of first objects which are bound to the image object in response to the image data comprised in the image object changing, wherein said automatically notifying occurs without user intervention;

each of the plurality of first objects automatically accessing the changed image data and processing the changed image data in response to the image object automatically notifying, wherein each of the plurality of first objects automatically accesses the changed image data and processes the changed image data without user intervention.

55. The method of claim 54, wherein the memory of the computer system stores a container program which contains the image object and the plurality of first objects, wherein the image object and the plurality of first objects are instantiated from the container;

wherein the image object notifies the plurality of first objects independent of the container program.

56. The method of claim 54, further comprising:

the image data comprised in the image object changing;

the plurality of first objects automatically accessing the changed image data and processing the changed image data in response to the image data comprised in the image object changing, wherein the plurality of first objects automatically accessing the changed image data and processing the changed image data occurs without user intervention.

57. The method of claim 54, wherein one or more of the plurality of first objects is a viewer object which is operable to display the image on the video display;

wherein the plurality of first objects processing the image data comprises the plurality of first objects displaying an image on the video display corresponding to the image data.

58. The method of claim 57, further comprising:

the image data comprised in the image object changing;

the image object automatically notifying the one or more viewer objects which are bound to the image object;

the one or more viewer objects automatically accessing the changed image data and displaying an image corresponding to the changed image data in response to the image object automatically notifying the one or more viewer objects which are bound to the image object;

wherein the image object notifies the one or more viewer objects, and the one or more viewer objects are each operable to access the changed image data and display an image corresponding to the changed image data without user intervention.

59. The method of claim 54, wherein each of the plurality of first objects is operable to perform an image processing algorithm on the image data corresponding to the image;

wherein each of the plurality of first objects processing the image data comprises each of the plurality of first objects performing an image processing algorithm on the image data.

60. The method of claim 54, further comprising:

creating an image application, wherein said creating includes configuring each of the plurality of first objects to dynamically bind to the image object;

initiating execution of the image application, wherein said acquiring image data, said storing the image data, said dynamically binding, and said processing are performed in response to said initiating execution of the image application.

61. The method of claim 60, wherein said configuring each of the plurality of first objects to dynamically bind to the image object includes adding program instructions which are executable to invoke a method on each of the plurality of first objects which cause each of the plurality of first objects to dynamically bind to the image object.

62. The method of claim 54, further comprising:

configuring each of the plurality of first objects to dynamically bind to the image object prior to said acquiring the image data.

63. The method of claim 54, wherein each of the plurality of first objects includes a method which is invoked by the user to bind the first object to the image object.

64. The system of claim 54, wherein each of the plurality of first objects includes a method which is invoked by the user to unbind the first object from the image object.

65. A memory medium which stores software for use in an image acquisition system, the image acquisition system comprising an image acquisition device for acquiring an image and a computer system coupled to the image acquisition device, wherein the computer system includes a video display and the memory medium, wherein the memory medium stores:

an image object which stores image data corresponding to the acquired image; and a plurality of first objects which are operable to process the image data, wherein each of the plurality of first objects is configurable by the user to bind to the image object;

wherein, in response to user configuration, each of the plurality of first objects is operable to dynamically bind to the image object to access the image data contained in the image object, wherein each of the plurality of first objects is operable to process the image data in response to binding to the image object, wherein each of the plurality of first objects is operable to dynamically bind to the image object and process the image data without user intervention;

wherein when the image data comprised in the image object changes, the image object is operable to automatically notify each of the plurality of first objects which are bound to the image object, wherein said automatic notification occurs without user intervention or user code; and wherein each of the plurality of first objects is operable to automatically access the changed image data and process the changed image data in response to notification from the image object, wherein each of the plurality of first objects is operable to automatically access the changed image data and process the changed image data without user intervention.

\* \* \* \* \*